United States Patent [19]

Iwasaki et al.

[11] Patent Number: 4,961,934

[45] Date of Patent: Oct. 9, 1990

[54] MILK REPLACER FOR INFANT CATTLE AND METHOD FOR BREEDING INFANT CATTLE USING THE SAME

[75] Inventors: Tetsuji Iwasaki, Wakayama; Yoshihisa Mori, Osaka, both of Japan

[73] Assignee: Kao Corporation, Tokyo, Japan

[21] Appl. No.: 309,650

[22] Filed: Feb. 13, 1989

[30] Foreign Application Priority Data

Feb. 12, 1988 [JP] Japan .................................. 63-30509
Feb. 24, 1988 [JP] Japan .................................. 63-41228

[51] Int. Cl.$^5$ ............................................. A23K 1/00
[52] U.S. Cl. ..................................... 426/002; 426/588; 426/602; 426/634; 426/807
[58] Field of Search .................... 426/2, 602, 623, 630, 426/634, 807, 580, 588

[56] References Cited

U.S. PATENT DOCUMENTS

| | | | |
|---|---|---|---|
| 4,054,677 | 10/1977 | Orban | 426/2 |
| 4,132,808 | 1/1979 | Kakade | 426/2 |
| 4,692,338 | 9/1987 | Irvine et al. | 426/2 |
| 4,734,402 | 3/1988 | Hashimoto et al. | 426/2 |
| 4,778,680 | 10/1988 | Hidaka et al. | 426/2 |

OTHER PUBLICATIONS

Hawley, "The Condensed Chemical Dictionary", Tenth Edition, 1982, pp. 190, 502 and 1049.

*Primary Examiner*—R. B. Penland
*Attorney, Agent, or Firm*—Sughrue, Mion, Zinn, MacPeak & Seas

[57] ABSTRACT

A milk replacer composition for infant cattle and a method of breeding infant cattle by feeding on the milk replacer composition are disclosed. The composition comprises a skim milk powder and/or a soybean meal as a main component, and at least 0.5% by weight of a triglyceride of a medium-chain fatty acid having from 6 to 10 carbon atoms. The milk replacer composition is effective to prevent or reduce the incidence of scours and the death rate of infant cattle.

6 Claims, No Drawings

MILK REPLACER FOR INFANT CATTLE AND METHOD FOR BREEDING INFANT CATTLE USING THE SAME

FIELD OF THE INVENTION

This invention relates to a milk replacer for infant cattle and a method of breeding infant cattle. More particularly, it relates to an improved milk replacer composition for infant cattle which is effective to reduce an incidence of scours or the death rate of infant cattle and to a method of breeding infant cattle by using the same.

BACKGROUND OF THE INVENTION

In stockbreeding, infant cattle which are naturally brought up with mother's milk, such as calves piglings, and kid, have hitherto been fed on a milk replacer for the purpose of advancing the weaning period to lighten the burden of dam cattle and also of accelerating growth. For example, it is known that polyglycerin/fatty acid ester (JP-A-58-60942), sugar alcohol/fatty acid ester (JP-A-58-60943) and calcium gluconate (JP-A-57-186445) (the term "JP-A" as used herein means an "unexamined published Japanese patent application") are added for the purpose of aiding the digestion and insorption in infant cattle. However, the state-of-the-art milk replacers are 1 far from mother's milk in performance properties, and cattle fed on the milk replacers have suffered from scours or death at a high rate. It has been, therefore, demanded to develop a milk replacer for infant cattle having improved properties.

SUMMARY OF THE INVENTION

One object of this invention is to provide a milk replacer for infant cattle which produces effects to reduce the incidence of scours or the death rate.

Another object of this invention is to provide a method of breeding infant cattle by using such milk replacer.

The inventors have conducted extensive investigations to develop an improved milk replacer for infant cattle in an attempt to achieve reduction of the incidence of scours or the death rate. As a result, it has now been found that incorporation of a triglyceride of a medium-chain fatty acid having from 6 to 10 carbon atoms into a milk replacer mainly comprising a skim milk powder and/or a soybean meal produces effects to improve nutritive qualities, markedly reducing the incidence of scours and the death rate of infant cattle.

The present invention relates to a milk replacer composition comprising a skim milk powder and/or a soybean meal as a main component, and at least 0.5% by weight of a triglyceride of a medium-chain fatty acid having from 6 to 10 carbon atoms.

The present invention further relates to a method of breeding infant cattle which comprises feeding infant cattle on an aqueous solution or dispersion of the above-described milk replacer composition

DETAILED DESCRIPTION OF THE INVENTION

The medium-chain fatty acid triglycerides (hereinafter, referred to as MCT) which can be used in this invention are available as commercial products under trade names of Kokonard MT (85 wt% caprylic acid and 15 wt% capric acid) and Kokonard RK (100 wt% caprylic acid) both sold by Kao Co., Ltd.

These triglycerides generally have a fatty acid composition comprising from 50 to 100% by weight of caprylic acid having 8 carbon atoms, up to 50% by weight of capric acid having 10 carbon atoms, and traces of other fatty acids.

The amount on MCT to be incorporated is at least 0.5% by weight, more preferably from 0.5 to 30% by weight, most preferably from 5 to 25% by weight, based on the total weight of the milk replacer composition.

The conventional milk replacers for infantcattle comprise a skim milk powder as a main component and other nutritives such as dry whey, fats and oils, saccharides (e.g., lard, beaf tallow, etc.), vitamins (e.g., vitamin A, vitamin B group, vitamins C, D and E, etc.), and inorganic substances (e.g., calcium phosphate, calcium carbonate, etc.). The objects of the present invention can be accomplished by using MCT either in place of fats and oils or in addition to the conventional components.

The preferred milk replacer composition in the present invention is composed of 60 to 85% by weight of a skim milk powder and/or a soybean meal, 5 to 30% by weight of a dry whey, 0 to 6% by weight of vitamines, 0 to 6% by weight of minerals, 3 to 30% by weight of MCT and 0 to 6% by weight of saccharides.

The milk replacer composition of the present invention is diluted several times, preferably 3 to 15 times, with water or warm water, and then is fed to infant cattle. In the preparation of the milk replacer composition, MCT may be added thereto after preparing an aqueous solution or dispersion (a diluted solution) of a milk replacer composition containing a skim milk powder and/or a soybean meal as a main component.

In the case of feeding infant cattle on an aqueous solution or dispersion of the above-described milk replacer composition, the concentration of MCT in the milk replacer composition to be fed in a dissolved or dispersed state in water is preferably at least 0.1% by weight, more preferably 0.5 to 10% by weight, most preferably 0.5 to 6% by weight. The preferred milk replacer composition to be fed in the case of breeding infant cattle is composed of 5 to 25% by weight of skim milk powder and/or a soybean meal, 2 to 10% by weight of a dry whey, 0 to 2% by weight of vitamins, 0 to 2% by weight of minerals, 0.5 to 10% by weight of MCT, 0 to 2% by weight of saccharides and the balance to make up 100% by weight substantially of water.

It has not been clearly elucidated by what mechanism the milk replacer composition of the invention produces the excellent effects. Considering that the conventional milk replacer compositions have adverse influences on infant cattle's digestion due to denaturation of the skim milk powder as the main component as described in JP-A-57-186445 (the term "JP-A" as used herein means an "unexamined published Japanese patent application"), it is assumed that addition of MCT markedly increases hydrophilic properties of the composition to aid the digestion and dispersion of skim milk in digestive organs, whereby energy can be directly supplied to infant cattle and, hence, MCT improves nutritive qualities of the milk replacer, bringing about prevention of the incidence of scours and the death rate.

Leaving reasoning aside, it is surprising that incorporation of MCT in a milk replacer composition brings about prevention of the incidence of scours and reduction of the death rate of infant cattle. Thus, the present invention considerably increases the value of milk replacers and makes a great contribution to advancement of the livestock industry.

The present invention is now illustrated in greater detail by way of the following Examples, but it should be understood that the present invention is not deemed to be limited thereto.

EXAMPLE 1

Each of compositions shown in Table 1 below was diluted with warm water at 40° C. so as to have a concentration of 10% by weight and the mixture was dispersed in a homomixer.

Five-day-old hoglings and calves (6 animals per group) detached from their mothers were fed on 0.25 kg and 4 kg of the dispersion, respectively, per day in two divisions for 21 days. The number of occurrences of scours, the number of deaths, and weight gains were measured during the feeding, and the results are shown in Table 2. The results of Table 2 prove the milk replacer compositions of the present invention are significantly effective to prevent the incidence of scours and to reduce the rate of death.

TABLE 1

| Formulation | Composition of Invention | | | | | | Comparative Composition | | |
|---|---|---|---|---|---|---|---|---|---|
| (wt %) | 1 | 2 | 3 | 4 | 5 | 6 | 7 | 8 | 9 |
| Skim milk powder | 82.0 | 78.0 | 73.0 | 63.0 | 68.0 | 73.0 | 68.0 | 78.0 | 83.0 |
| Dry whey | 14.0 | 14.0 | 14.0 | 14.0 | 14.0 | 14.0 | 14.0 | 14.0 | 14.0 |
| Premix* | 1.0 | 1.0 | 1.0 | 1.0 | 1.0 | 1.0 | 1.0 | 1.0 | 1.0 |
| Beef tallow | 0 | 0 | 0 | 0 | 10.0 | 5.0 | 15.0 | 5.0 | 0 |
| Glucose | 2.0 | 2.0 | 2.0 | 2.0 | 2.0 | 2.0 | 2.0 | 2.0 | 2.0 |
| MCT** | 1.0 | 5.0 | 10.0 | 20.0 | 5.0 | 5.0 | 0 | 0 | 0 |

Note:
*A mixture of vitamins and minerals
**Kokonard PK (triglycerides ($C_8$), manufactured by Kao Co., Ltd.)

TABLE 2

| Kind of Cattle | Number of Composition | Body Weight (kg) | | Number of Deaths | Number of Occurrences of Scours |
|---|---|---|---|---|---|
| | | Before Feeding | After Feeding | | |
| Hogling | 1 | 2.0 | 5.3 | 0 | 0 |
| " | 2 | 2.0 | 5.7 | 0 | 0 |
| " | 3 | 2.1 | 5.8 | 0 | 0 |
| " | 4 | 2.1 | 5.8 | 0 | 0 |
| " | 5 | 2.2 | 5.7 | 0 | 0 |
| " | 6 | 2.0 | 5.8 | 0 | 0 |
| " | 7 | 2.1 | 4.2 | 3 | 5 |
| " | 8 | 2.0 | 4.2 | 2 | 6 |
| " | 9 | 2.0 | 4.0 | 3 | 6 |
| Calf | 1 | 39.2 | 49.1 | 0 | 0 |
| " | 2 | 39.8 | 52.0 | 0 | 0 |
| " | 3 | 39.6 | 50.0 | 0 | 0 |
| " | 4 | 39.4 | 54.0 | 0 | 0 |
| " | 5 | 39.7 | 49.8 | 0 | 0 |
| " | 6 | 39.8 | 50.0 | 0 | 0 |
| " | 7 | 39.8 | 42.9 | 2 | 6 |
| " | 8 | 39.8 | 42.9 | 3 | 6 |
| " | 9 | 39.7 | 42.1 | 2 | 6 |

EXAMPLE 2

The same tests of Example 1 were conducted using each of the milk replacer compositions shown in Table 3. As shown in Table 4, the results obtained demonstrate the significant effect of the milk replacer compositions of the invention in prevention of the incidence of scours and the rate of death

TABLE 3

| Formulation | Composition of Invention | | | | Comparative Composition | | |
|---|---|---|---|---|---|---|---|
| (wt %) | 1 | 2 | 3 | 4 | 5 | 6 | 7 |
| Soybean meal | 82.0 | 73.0 | 68.0 | 73.0 | 68.0 | 78.0 | 83.0 |
| Dry whey | 14.0 | 14.0 | 14.0 | 14.0 | 14.0 | 14.0 | 14.0 |
| Premix | 1.0 | 1.0 | 1.0 | 1.0 | 1.0 | 1.0 | 1.0 |
| Beef tallow | 0 | 0 | 10.0 | 5.0 | 15.0 | 5.0 | 0 |
| Glucose | 2.0 | 2.0 | 2.0 | 2.0 | 2.0 | 2.0 | 2.0 |
| MCT | 1.0 | 10.0 | 5.0 | 5.0 | 0 | 0 | 0 |

TABLE 4

| Kind of Cattle | Number of Composition | Body Weight (kg) | | Number of Deaths | Number of Occurrences of Scours |
|---|---|---|---|---|---|
| | | Before Feeding | After Feeding | | |
| Hogling | 1 | 2.1 | 6.2 | 0 | 0 |
| " | 2 | 2.2 | 6.8 | 0 | 0 |
| " | 3 | 2.0 | 6.4 | 0 | 0 |
| " | 4 | 2.1 | 6.4 | 0 | 0 |
| " | 5 | 2.0 | 4.1 | 3 | 7 |
| " | 6 | 2.2 | 3.9 | 4 | 6 |

TABLE 4-continued

| Kind of Cattle | Number of Composition | Body Weight (kg) Before Feeding | Body Weight (kg) After Feeding | Number of Deaths | Number of Occurrences of Scours |
|---|---|---|---|---|---|
| " | 7 | 2.1 | 3.5 | 5 | 3 |
| Calf | 1 | 39.2 | 55.6 | 0 | 0 |
| " | 2 | 39.5 | 59.7 | 0 | 0 |
| " | 3 | 39.0 | 56.1 | 0 | 0 |
| " | 4 | 39.8 | 55.2 | 0 | 0 |
| " | 5 | 39.4 | 47.8 | 2 | 10 |
| " | 6 | 39.1 | 47.1 | 3 | 10 |
| " | 7 | 38.9 | 45.1 | 3 | 7 |

While the invention has been described in detail and with reference to specific embodiments thereof, it will be apparent to one skilled in the art that various changes and modifications can be made therein without departing from the spirit and scope thereof.

What is claimed is:

1. A milk replacer composition for infant cattle comprising a skim milk powder and/or a soybean meal as a main component, wherein said composition contains at least 0.5% by weight of a triglyceride of a medium-chain fatty acid having from 6 to 10 carbon atoms, based on the total weight of said composition, wherein the skim milk powder and/or soybean meal is present in an amount of 60 to 85% by weight.

2. A milk replacer composition as claimed in claim 1, wherein said triglyceride is present in an amount of up to 30% by weight.

3. A milk replacer composition as claimed in claim 1, wherein said triglyceride is present in an amount of 5 to 25% by weight.

4. A method of breeding infant cattle which comprises feeding infant cattle on an aqueous solution or dispersion of a milk replacer composition comprising a skim milk powder and/or a soybean meal as a main component, wherein said aqueous solution or dispersion contains at least 0.1% by weight of a triglyceride of a medium-chain fatty acid having from 6 to 10 carbon atoms, wherein the skim milk powder and/or soybean meal is present in an amount of 60 to 85% by weight.

5. A method as claimed in claim 4, wherein said aqueous solution or dispersion contains 0.5 to 10% by weight of said triglyceride.

6. A method as claimed in claim 4, wherein aid aqueous solution or dispersion contains 0.5 to 6% by weight of said triglyceride.

* * * * *